United States Patent [19]

Cheng

[11] Patent Number: 5,653,278
[45] Date of Patent: Aug. 5, 1997

[54] AUTOMOBILE FRONT AND REAR WINDSHIELD SUNSHADE DEVICE

[76] Inventor: Po-Wen Cheng, P.O. Box 90, Tainan, 704, Taiwan

[21] Appl. No.: 656,930

[22] Filed: Jun. 3, 1996

[51] Int. Cl.$^6$ ..................................................... G60J 3/02
[52] U.S. Cl. ..................... 160/370.22; 160/24; 160/310
[58] Field of Search ................... 160/370.22, 22, 160/23.1, 24, 310, 68, 311, 312, 66, 70, 79; 296/97.4, 97.7, 97.8, 97.9, 143

[56] References Cited

U.S. PATENT DOCUMENTS

| | | | |
|---|---|---|---|
| 2,594,386 | 4/1952 | Blessen | 160/370.22 X |
| 4,286,343 | 9/1981 | Lampka | 160/22 X |
| 4,836,263 | 6/1989 | Ament | 160/370.22 X |
| 4,874,026 | 10/1989 | Worrall | 160/370.22 X |
| 4,898,224 | 2/1990 | Woodworth | 160/310 |
| 4,953,609 | 9/1990 | Annin et al. | 160/24 |
| 5,033,527 | 7/1991 | Ouvrard et al. | 160/310 |
| 5,076,633 | 12/1991 | Hsu et al. | 160/370.22 X |
| 5,284,198 | 2/1994 | Kauka | 160/370.22 X |
| 5,291,934 | 3/1994 | Ouvrard et al. | 160/370.22 X |
| 5,468,040 | 11/1995 | Hsieh et al. | 160/370.22 X |

*Primary Examiner*—David M. Purol
*Attorney, Agent, or Firm*—Bacon & Thomas

[57] ABSTRACT

An automobile front and rear windshield sunshade device includes a base, a housing for containing a sunshade unit, two support arm units able to be folded in the housing and to be swung up to lift a shade curtain of the sunshade unit by rotation of a motor. When the shade curtain is lifted to shade the front or the rear windshield of an automobile, the motor is cut off by an actuating extension of the lower arm of one of the support arm unit pressing a contact block of a first contact switch. The first contact switch can be adjusted in its position to change the height the the shade curtain is lifted. The housing can be adjusted in its angle relative to the base to adapt to various angles of different front or rear windshields of automobiles.

3 Claims, 7 Drawing Sheets

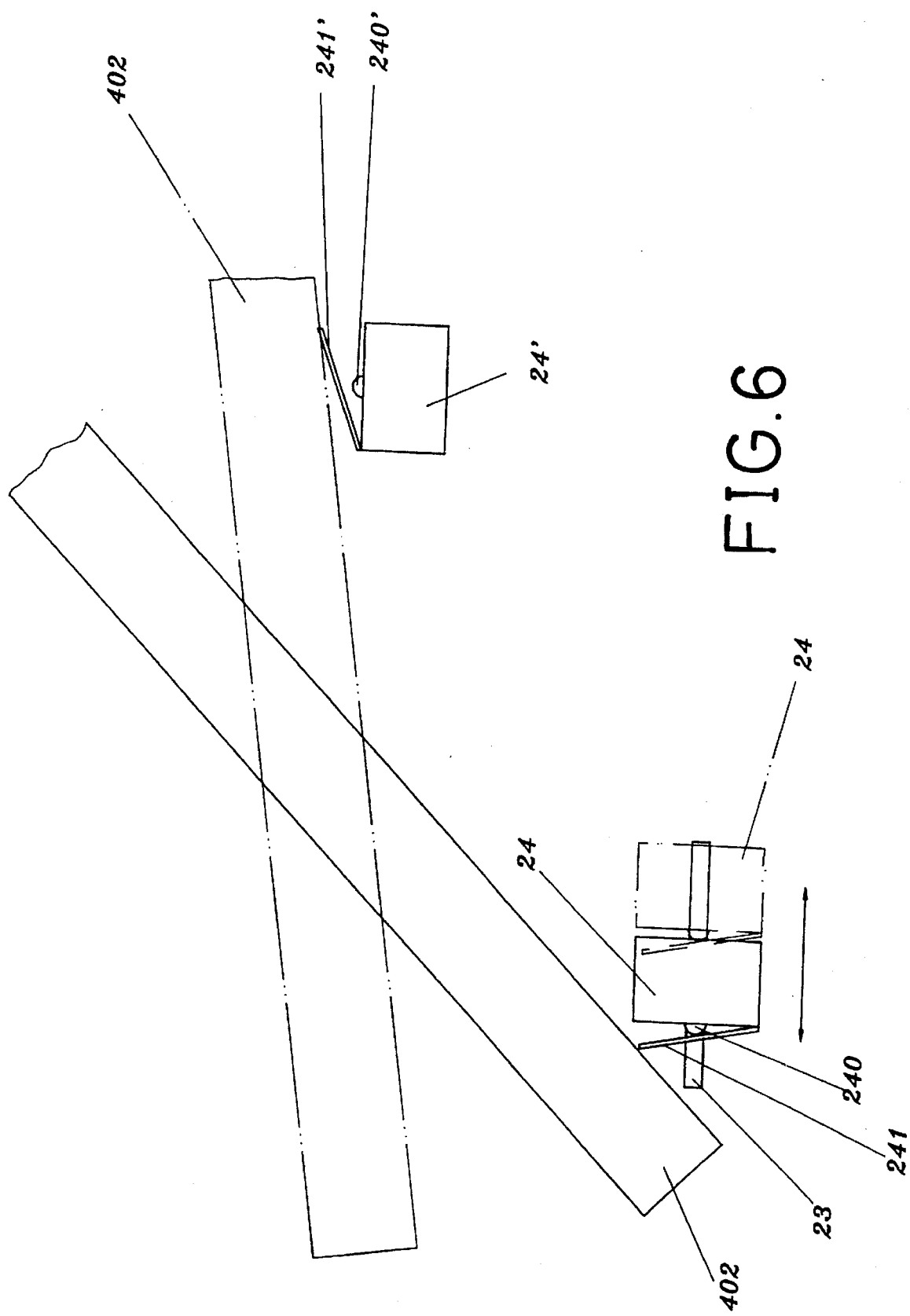

5,653,278

AUTOMOBILE FRONT AND REAR WINDSHIELD SUNSHADE DEVICE

BACKGROUND OF THE INVENTION

This invention concerns an automobile front and rear windshield sunshade device, particularly controlled to go up or down by two switches fixed on the gauge panel of an automobile, and adaptable to different heights and angles of front and rear windshields of different styles of automobiles.

A known conventional automobile rear windshield sunshade device as shown in FIGS. 1 and 2 includes a housing base A, a shade curtain B with a rod, an upper support block E, and a support rod D combined together.

The housing base A has plural threaded holes A2 in a bottom plate for screws to fix the housing base A on a flat surface C in front of the rear windshield of an automobile, and a lengthwise curved up portion A1 for fitting the sunshade curtain B with the rod therein.

The shade curtain B has a grip B1 on an upper center end, which can be hung on a hook E1 of the support block E. The support block E also has a hole base E2 formed in a lower portion, and a curved-down upper portion E3 to fit with a lateral strip provided along an upper end of the rear windshield of an automobile. Then the support rod D has two ends inserted in the housing base A and the hole base E2 of the support block E. In case of need, the shade curtain B is pulled up out of the curved up portion A1 with the grip B1 manually moved up to hang on the hook E1 for shading the rear windshield.

However, the known conventional rear windshield sunshade device has disadvantages as follows in practical use.

1. The shade curtain B is fixed in a definite direction, unable to adapt to various angles of different rear windshields of many styles of automobiles.

2. The distance between the flat surface C in front of the rear windshield and the car roof line F may be not the same for various styles of automobiles, and then the support rod having a fixed length may be too short or long to completely cover the rear windshield.

3. As it is manually operated to shade the rear windshield, it cannot be operated if there is no person sitting in the back seat. Consequently, a driver has to stop the car in order to pull the shade curtain, which is very troublesome.

SUMMARY OF THE INVENTION

A main purpose of the invention is to offer an automobile front and rear windshield sunshade device operable electrically by means of switches fixed on the gauge panel of an automobile, and in addition, adaptable to various heights and angles of different front and rear windshields of many styles of automobiles.

One feature of the invention is a base combined with and under a housing by means of two thumb screws to change the angle of the housing so that a shade curtain housed in the housing may be adapted to different angles of front and rear windshields of many styles of automobiles.

Another feature of the invention is two support arm units for lifting and lowering the shade curtain. Each support arm unit consists of two arms connected pivotally with two connectors with a spring put between them so that the arm unit may be moved to swing up and down to lift the shade curtain from the housing or to let it roll down around a winding cylinder housed in the housing in which the winding cylinder is rotated by a motor.

Another feature of the invention is a first contact switch to be contacted and pressed by an actuating extension of a lower arm of one support arm unit to cut off the motor when the shade curtain is pulled up to the upper end of the rear windshield and a second contact switch to be contacted and pressed by a lower arm of another support arm unit to cut off the motor when the shade curtain is wound down to the lowest position.

One more feature of the invention is the first contact switch adjustable in its position by means of a screw passing through a horizontal slot bored in a front side of the housing so that the height of the shade curtain to be lifted may be adjusted to adapt to different sizes of front and rear windshields of various styles of automobiles.

BRIEF DESCRIPTION OF DRAWINGS

This invention will be better understood by reference to the accompanying drawings, wherein:

FIG. 6 is a side view of a first contact switch in contact with a lower arm of one support arm unit in the present invention;

DESCRIPTION OF THE PREFERRED EMBODIMENT

Figure 1:
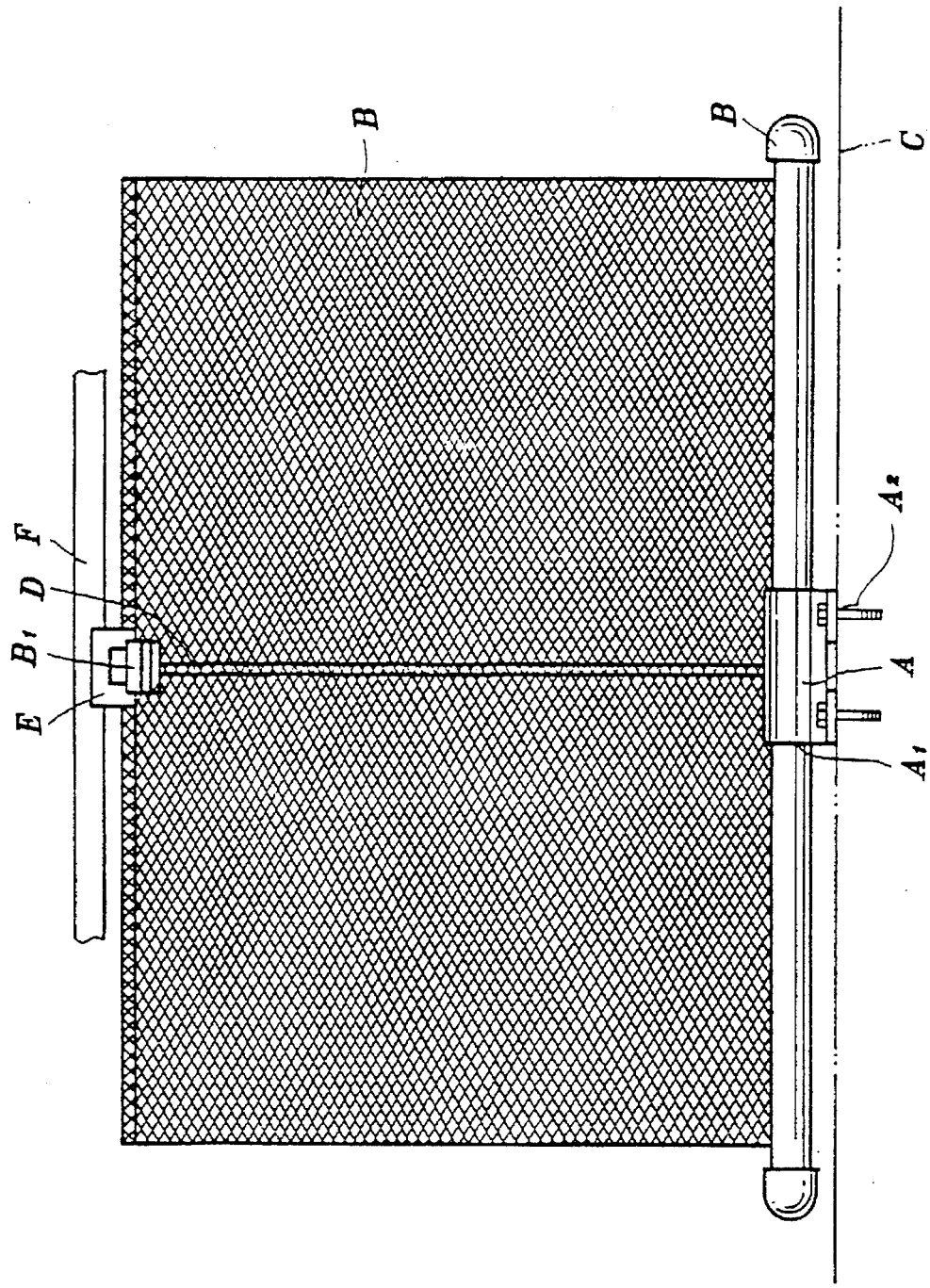
FIG. 1 is a front view of a known conventional automobile rear windshield sunshade device.
Figure 2:
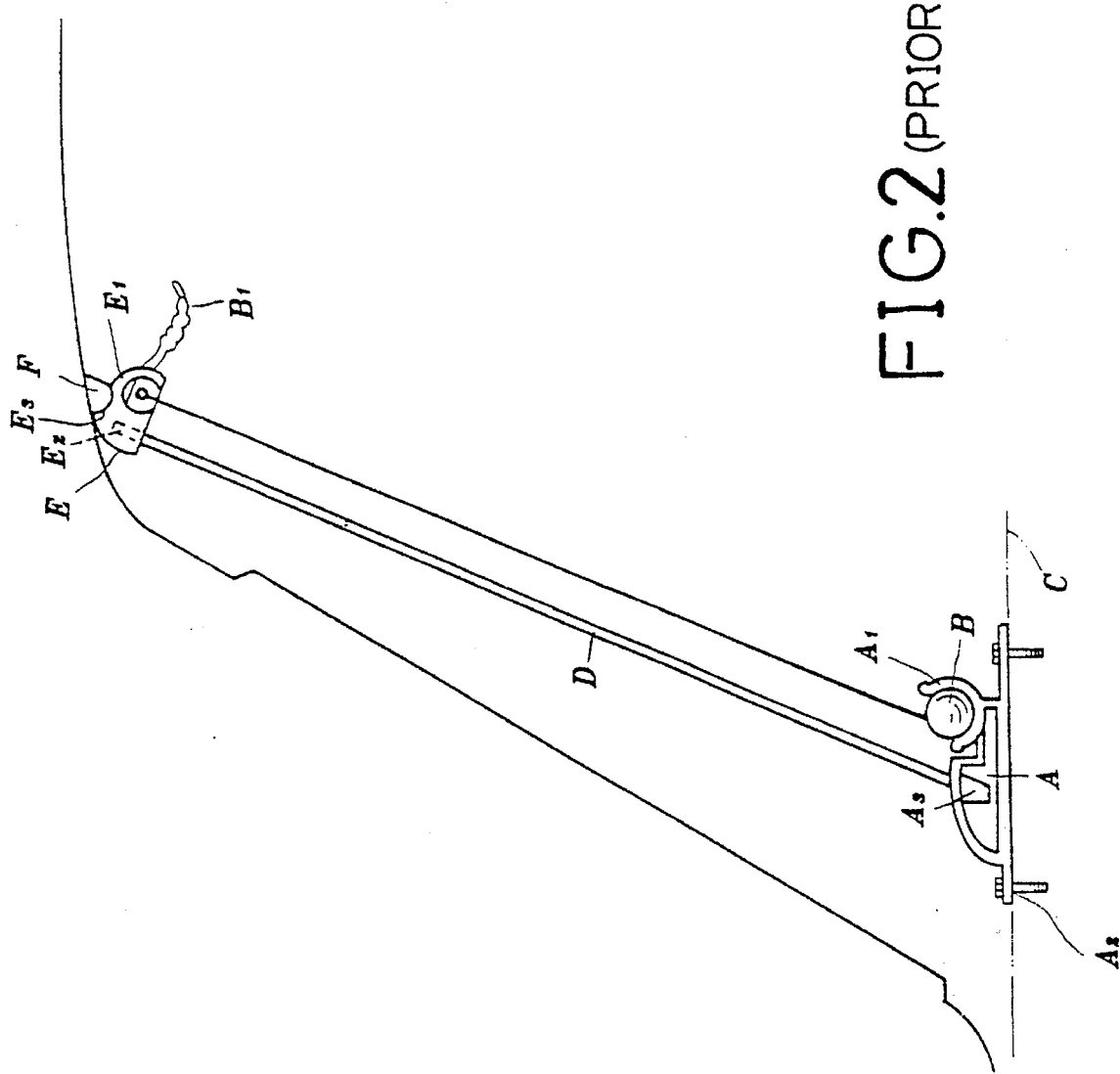
FIG. 2 is a slide view of the known conventional automobile rear windshield sunshade device.
Figure 3:
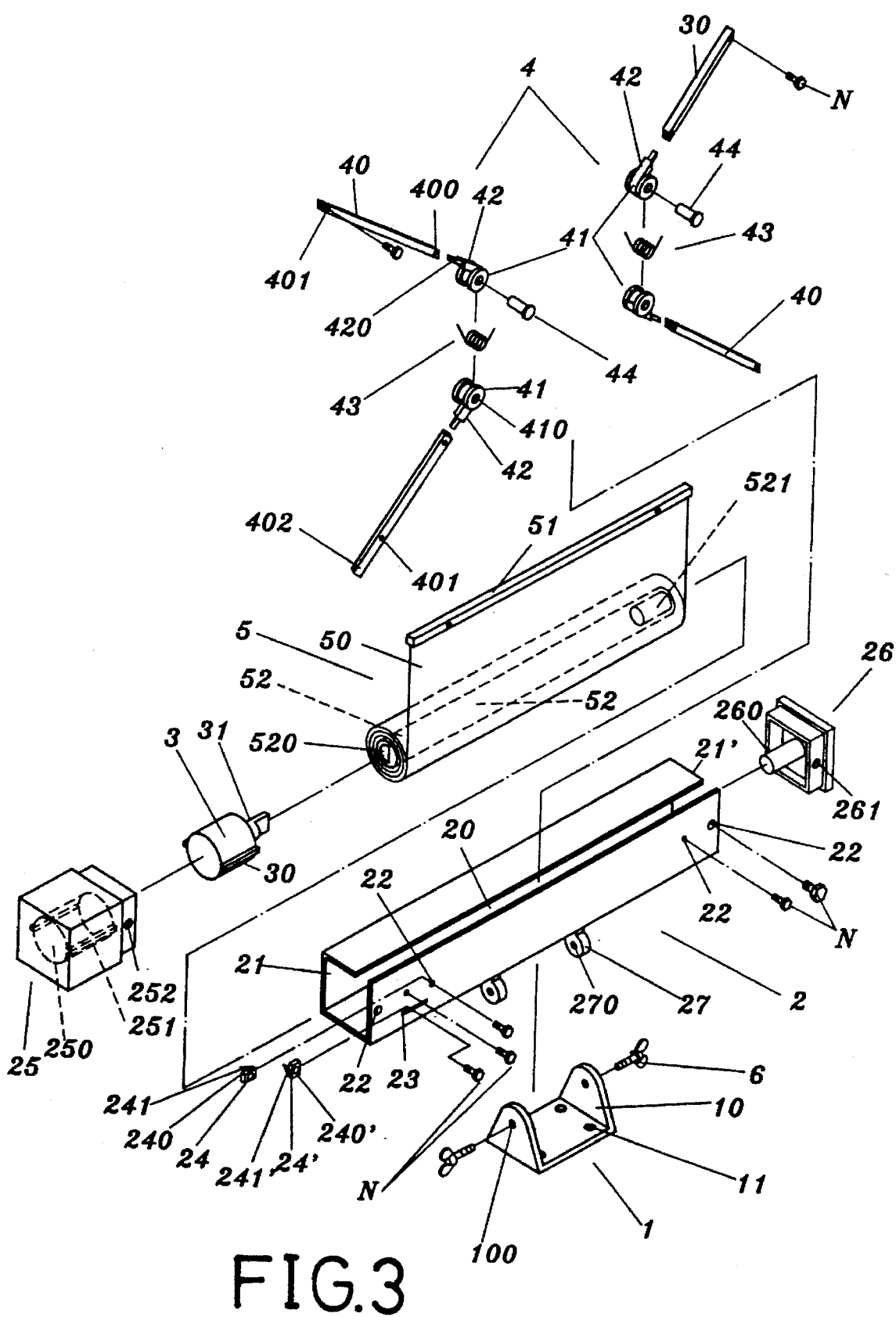
FIG. 3 is an exploded perspective view of an automobile front and rear windshield sunshade device in the present invention.

A preferred embodiment of an automobile rear windshield sunshade device in the present invention, as shown in FIG. 3, includes a U-shaped base 1, a housing 2 shaped as an elongate case of a square or rectangular cross-section and having two—a right and a left—open sides, a motor 3, two support arm units 4, 4, a sunshade unit 5 and two thumb screws 6, as main components combined together.

The U-shaped base 1 is formed by bending a flat plate, having two vertical triangular sides 10 and a bottom side. Each vertical triangular side 10 has a threaded hole 100 near the top and the bottom side has plural holes 11 for screws to fix the base 1 on a flat surface in front of the rear windshield of an automobile.

The housing 2 has a lengthwise opening 20 in an upper side for a shade curtain 50 to pass through, an open left side 21, an open right side 21', plural holes 22 in a line in a left section and in a right section of a front side and a slot 23 below the holes 22 in the left end section of the front side. A first contact switch 24 is located in the housing 2, fixed with a screw N passing through the slot 23 from outside, and a second contact switch 24' is fixed with the front side of the housing 2 with a screw N and located in 45 degrees to the first contact switch 24. Each contact switch 24, 24' is rectangular, having a projecting contact block 240, 240' on the top surface, and a contact piece 241, 241' extending obliquely from the top surface. A left and a right side cap 25 and 26 are provided to close up the two open sides 21, 21' of the housing 2. The left side cap 25 is shaped square, having an interior cavity 250 and two opposite grooves 251 at two opposite lengthwise sides of the cavity 250, and a threaded hole 252 in a front side to correspond to the hole 22 of the housing 2 for a screw N to combine the both together. The right side cap 26 is also square, having a lengthwise shaft 260 extending inward from the center of an inner wall, and a threaded hole 261 in a front side to correspond to one of the holes 22 in the right section of the front side of the housing 2. Further, two disk-shaped thumb screw supporters 27 are provided spaced apart under the front side of the housing 2, having a screw hole 270 to face the threaded hole 100 of each vertical side 10 of the base 1 for the thumb screws 6 to combine the housing 2 with the base 1 tightly in one of many angles of the housing 2 relative to the base 1.

The motor 3 is housed in the interior cavity 250 of the left side cap 25 of the housing 2, having two opposite projecting ridges 30 to engage the two grooves 251 of the left side cap 25 and a shaft 31 with a D-shaped end extending rightward.

The two support arm units 4, 4 respectively consist of two tubular arms 40, two disc-shaped connecters 41 connecting the two arms 40 with a spring 43 put between the two connecters 41 and a pin 44 fitting in the two connecters 41 and the spring 43. Each connecter 41 has a short inserter 42 extending sidewise to insert in an inner end of each arm 40 and the short inserter 42 has a threaded hole 420 facing a hole 400 in each arm 40. The lower arm 40 has an actuating extension 402 extending from the free end to correspond to the first contact switch 24 located on the slot 23 of the housing 2. Each connecter 41 has a center pivotal hole 410 for the pin 44 to fit through and through the spring 43 as well so that the pin 44 may combine two arms 40, 40 with the two connecters 41. Further, the lower end of the lower arm 40 of each support arm unit 4 is screwed with the front side of the housing 2.

The sunshade unit 5 is located inside the housing 2, having a shade curtain 50, a connect rod 51 fixed with an upper end of the shade curtain 50 and combined pivotally with the upper end of the upper arm 40 of each support arm unit 4 and a winding cylinder 52 for winding the shade curtain around itself. The lower end of the shade curtain 50 is fixed with the winding cylinder which has a left end provided with a D-shaped hole 520 for the D-shaped end of the shaft 31 of the motor 3 to engage with and a right end provided with a tubular hole 521 for the center shaft 260 of the right side cap 26 to fit therein.

Two thumb screws 6 are provided to combine the base 1 with the housing 2, able to be screwed tight or loose so as to permit the housing 2 adjusted in its angle relative to the base 1 so that the angle of the shade curtain 50 may be adjusted thereby to adapt to the angle of the rear windshield of an automobile, by screwing the thumb screws 6 in the pivotal holes 270 of the thumb screw supporters 27 and the threaded holes 100 of the base 1.

Figure 4:
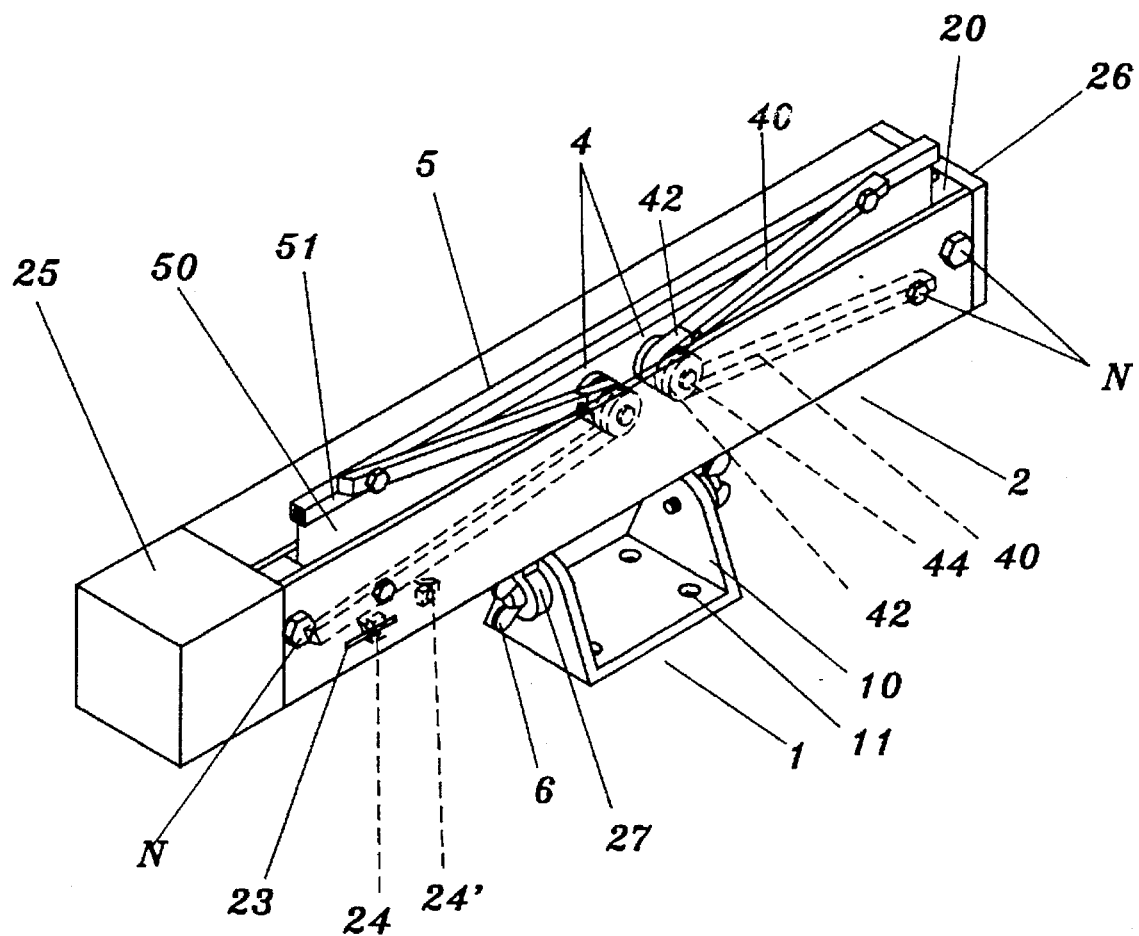
FIG. 4 is a perspective view of the automobile front and rear windshield sunshade device in the present invention, showing a shade curtain rolled in a housing.
Figure 5:
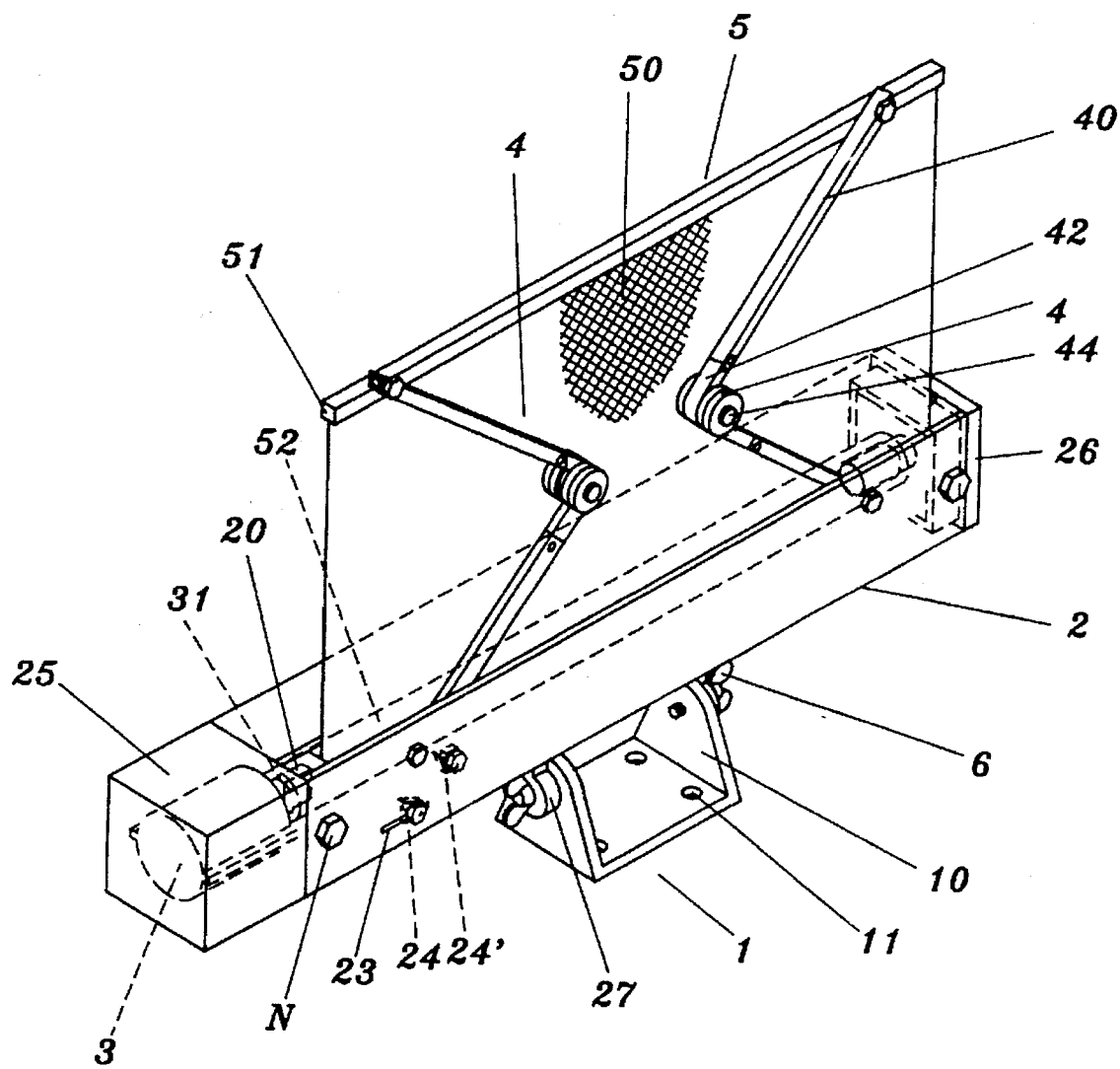
FIG. 5 is a perspective view of the automobile front and rear windshield sunshade device in the present invention, showing the shade curtain pulled up from the housing.

In assembling, as shown in FIGS. 3 and 4, firstly, each two connecters 41 are put together, with the spring 43 put between them, and with the pivotal holes 410 aligned to the center hole of the spring 43, and then the pin 44 is put through the pivotal holes 410 and the center hollow of the spring 43 and then fixed firmly in that position by pressing. Next, the short inserter 42 of each connecter 41 is inserted in one end of each arm 40, with the threaded hole 420 of each short inserter 42 aligned to the hole 400 of each arm 40, and then a screw N is screwed in the hole 420 and the hole 400. Then the lower end of the lower arm 40 of the left support arm unit 4 is placed in an inner left end section of the front side of the housing 2, with the end of the actuating extension 402 of the lower arm 40 facing to the slot 23 of the housing 2, and with a screw N screwing in the threaded hole 401 and the hole 22 of the housing 2. Then the first and the second contact switches 24 and 24' are respectively kept secured in front of the slot 23 and at the preset position of the inner wall of the front side of the housing 2. Then the sunshade unit 5 is positioned in the housing 2, with the connect rod 51 located out of the opening 20 of the housing 2, with screws N screwing the upper end of each upper arm 40 of each support arm unit 4 with the connect rod 51. Further, the motor 3 is fitted in the interior cavity 250 of the left side cap 25, with the projecting ridges 30 engaging with the grooves 251, and with the end of the shaft 31 engaging with the shaft hole 520 of the winding cylinder 52. Then the two side caps 25, 26 are respectively closed up the open right and the open left side 21 and 21 of the housing 2, with the threaded holes 252, 261 aligned to the holes 22 of the housing 2 and screwed with screws N. Further, the screw holes 270 of the thumb screw supporters 27 are aligned to the threaded holes 100 of the two vertical sides 10 of the base 1, and then thumb screws 6 are engaged with the screw holes 270 and the threaded holes 100, able to be loosened or tightened to adjust the angle of the housing 2 relative to the base 1. And finally screws N are used to fix the base 1 on the flat surface in front of the rear windshield, screwing in the holes 11 of the base 1.

Figure 8:
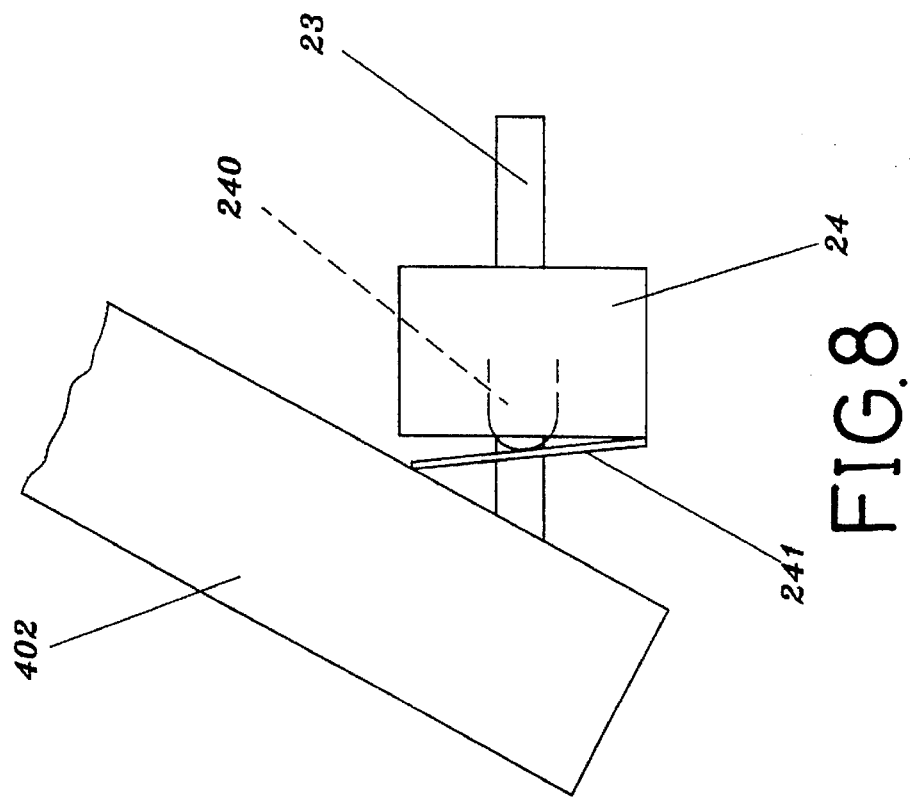
Figure 7:
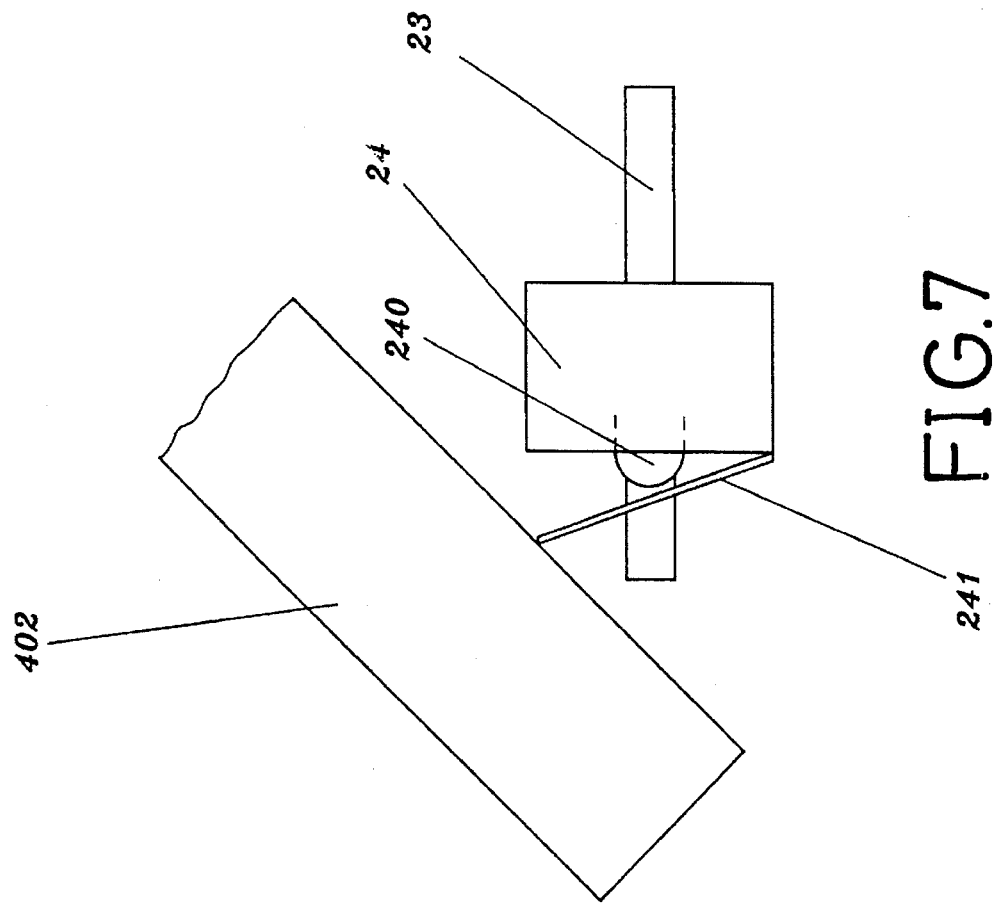
FIG. 7 is a side view of the first contact switch being pressed by the lower arm of a left support arm unit in the present invention; and, FIG. 8 is a side view of the first contact switch completely pressed by the lower arm of the left support arm unit in the present invention.

In using, as shown in FIGS. 4–8, the thumb screws 6 are loosened and the housing 2 is manually moved to change its angle relative to the base 1, and then the screws 6 are tightened to keep the housing 2 in its adjusted position. Then the first contact switch 24 is moved in its position by moving the screw N in the slot 23, as shown in FIG. 6, to the lowest point where the actuating extension 402 reaches in rising movement of the left support arm unit 4. Under this condition, in case a switch for the motor 3 fixed on the gauge panel of an automobile is turned on, the motor 3 is rotated counterclockwise, with the shaft 31 rotating the winding cylinder 52 also counterclockwise. Meanwhile, the springs 43 have elasticity to let the two connecters 41 to move outward so that the two pairs of the two arms 40 are spread open to lift the connect rod 51 together with the shade curtain 50 until the actuating extension 402 of the lower arm 40 contacts and pushes the contact piece 241 and then the contact block 240, which then cuts off electricity of the motor 3, which then stops, as shown in FIGS. 7 and 8. Then the shade curtain 50 is fully pulled up to shade the rear windshield and keeps it in that position.

On the contrary, if the shade curtain 50 is wanted to be lowered down and wound on the winding cylinder another switch for turning on the motor to rotate clockwise fixed on the gauge panel of a car is turned on to start the motor 3, which then rotates the shaft 31 clockwise to revolve the winding cylinder 52 clockwise. Then the shade curtain 50 together with the connect rod 51 is pulled down by rotation of the winding cylinder 52, with the support arm units 4 also pulled and folding down gradually to the folded position shown in FIG. 4. When the lower arm 40 of the left support arm unit 4 goes down to the lowest position, touching the second contact switch 24', the motor 3 is at once turned off, as shown in FIG. 6. Under the folded condition of the shade curtain 50 the springs 43 are in contracted condition.

As understood from the above description, this invention has the following advantages.

1. The thumb screws 6 enable the housing 2 adjusted in one of many angles relative to the base 1 so that the shade curtain 50 is adjustable to various angles of the front or the rear windshields of different styles of automobiles.

2. The height of the shade curtain 50 to be lifted can be adjusted by means of the first contact switch 24 also movable in its position by means of a screw fitting through the slot 23 of the front side of the housing 2, together with the function of the springs 43 of the connecters 41.

3. The control switches of the motor 3 are fixed in the gauge panel of an automobile together with the contact switches 24, 24' make this invention more convenient for practical use than the conventional ones.

While the preferred embodiment of the invention has been described above, it will be recognized and understood that various modifications may be made therein and the appended claims are intended to cover all such modifications which may fall within the spirit and scope of the invention.

What is claimed is:

1. An automobile front-and rear windshield sunshade device comprising:

a base having a flat portion and two vertical triangular sides, said base being fixed on a flat surface of a front windshield or a rear windshield of an automobile, said vertical triangular sides respectively having a threaded hole near the top for a thumb screw to engage therewith;

an elongate housing of a rectangular or square cross-section, having a lengthwise opening in an upper side and two opposite sides respectively closed up with a left side cap having an interior cavity for housing a motor and a right side cap, a from vertical side provided with a plurality of holes and a slot, first and second contact switches screwed on an inner wall of said front vertical side, said first contact switch being secured with a screw passing through said slot from the outside so as to permit said contact switch to be adjustable in its position within the distance of said slot, and two disk-shaped thumb screw supporters fixed and spaced apart under said front side for adjustably securing said housing with said base;

a motor housed in said interior cavity of said left side cap and having a shaft with a D-shaped end;

a left support arm unit and a right support arm unit each respectively consisting of an upper and a lower tubular arm, a pair of connecters pivotally connecting said tubular arms of each support arm unit at their inner ends by means of a spring fitted between said pair of connecters and a pin passing through center holes thereof of said connecters and said spring to let said arms move relative to each other, each said connecter having a sidewise short inserter to insert in an inner end of each said arm, said lower arm of said left support arm unit having an actuating extension extending from a lower end of said lower arm and secured with said from side of said housing so as to permit said lower arm to swing up and down with said secured point as a fulcrum, said actuating extension touching and pressing a contact piece of contact switch of said slot to turn off said motor when said actuating extension is swung to a lowest position;

a sunshade unit contained in said housing having a shade curtain, a winding cylinder fixed with a lower end of said shade curtain for winding said shade curtain around itself, and a lengthwise connecting rod fixed with an upper end of said shade curtain and pivotally combined with an upper end of said upper arm of each said support arm unit, said winding cylinder having a left end provided with a D-shaped hole for said D-shaped end of said shaft of said motor to fit therein so that said winding cylinder may be rotated by said motor;

two thumb screws combining said base with said housing by screwing in said threaded holes of said two thumb screw supporters and of said base, permitting said housing to be adjustable to different angles relative to said base; and characterized by said motor being started by turning on a first control switch fixed on the gauge panel of an automobile to rotate said winding cylinder counterclockwise, said winding cylinder then rotated to force said shade curtain to extend from said winding cylinder and being pulled up by said arms of each said support arm unit to move upward from a folded condition in said housing, said first contact switch of said slot being adjusted in its position so that it can be contacted and pressed by said actuating extension of said lower arm to cut off said motor when said support arm units lift up said shade curtain to the upper end of said front or said rear windshield, said first contact switch of said slot able to change the height of said support arm units together with said shade curtain to be lifted by changing its location in the distance of said slot, and said housing being able to be adjusted relative to said base to adapt to various angles of the rear windshields of different styles of automobiles by means of said two thumb screws.

2. The automobile front and rear windshield sunshade device as claimed in claim 1, wherein said motor has a shaft with a D-shaped end, and said winding cylinder has a D-shaped shaft hole for said D-shaped end of said shaft of said motor to fit firmly together so that said winding cylinder may be rotated by said motor when said motor is operated.

3. The automobile front and rear windshield sunshade device as claimed in claim 1, wherein said left side cap further has two lengthwise grooves at two opposite sides of said interior cavity, and said motor has two opposite lengthwise projecting ridges on its outer surface to engage with said grooves of said left side cap so that said motor may be fitted therein.

* * * * *